United States Patent [19]
Kemper

[11] 3,744,769
[45] July 10, 1973

[54] KNEADING DEVICE
[76] Inventor: Kate Kemper, Wybuelstrasse 6, CH-8702, Zollikon, Switzerland
[22] Filed: May 3, 1972
[21] Appl. No.: 250,033

[30] Foreign Application Priority Data
May 10, 1971 Germany .................. P 21 22 969.6

[52] U.S. Cl. .............................................. 259/185
[51] Int. Cl. .............................................. A21c 9/00
[58] Field of Search ................... 259/185, 186, 188, 259/194

[56] References Cited
UNITED STATES PATENTS
3,001,486 9/1961 Duncan .............................. 259/185
3,507,227 4/1970 Pickles .............................. 259/185
3,543,698 12/1970 Hans .................................. 259/185
3,547,053 12/1970 Mueller .............................. 259/185

*Primary Examiner*—Robert W. Jenkins
*Attorney*—George H. Spencer, Harvey Kaye et al.

[57] ABSTRACT

A kneading device comprises dough receiving and kneading means for receiving dough pieces and carrying out a kneading operation thereon, means for feeding the dough pieces to the dough receiving and kneading means and spray means situated before the feeding means for spraying the dough receiving and kneading means prior to the feed of thereonto of the dough pieces.

11 Claims, 3 Drawing Figures

KNEADING DEVICE

BACKGROUND OF THE INVENTION

One known form of kneading device is the round drum kneader, which is enclosed along the kneading distance by a synchronous kneading strip and consists of two rotary drums which rotate horizontally in the same sense and are mounted coaxially one within the other; of which drums, the inner is provided with notches on the casing and is oscillatable additionally both axially and circumferentially relative to the outermost drum which is provided with kneading recesses in the form of drum casing openings, the recesses being associated with the notches in such a manner that the notches of the inner drum execute rotary movements in the drum casing openings.

A fully automatic operating kneading device of this kind is known per se. The round drum kneading machine was developed from a so-called semi-automatic dough parting and kneading machine, which operates with a removable kneading plate, on which the dough is placed in a uniform and easily distributed manner. The plate in this case is inserted into the machine, and has to rest in a planar manner on a kneading plate. By pulling down a pressure lever, the dough is automatically enclosed by a ring and thus limited. A plane pressure plate is lowered onto the piece of dough and exerts a pressure thereon. In so doing, the soft dough is spread uniformly onto the kneading plate. With the pressure lever pulled down the cutting lever is now operated. In so doing, a knife star, built into the pressure plate, falls on the break and divides this up uniformly into a large number of like circular segments. After that, the kneading lever is operated, whereby an eccentric in the kneading table is moved outwards from the rotating center. The eccentric engages in the kneading plate and also causes the latter to execute eccentric circular movements. After the kneading plate with the distributed break lies on the kneading plate, this is caused to execute a rotatory movement. The individual sides of the knife star lock the divided dough pieces in their movement and thus knead the piece of dough.

When making pieces of dough into small loaves or rolls, such as French loaves, rose-shaped rolls (Rosenbrotchen) or "bloomer" loaves (Passauer Laiberl) it is necessary to knead or prepare the so called cut in such a manner that it bursts open during the baking process. In order to achieve this, it is necessary for a kneading plate to be lightly greased before placing dough pieces thereon, in the case of the above mentioned semi-automatic kneading machines, so that the grease can be kneaded into the cuts of the dough pieces. In this way, it is possible for the cuts to split well at predetermined places of the dough pieces and the baker's ware receives a desired fine pattern.

The greasing of the kneading plate has hitherto been basically carried out by hand. This is not important in the case of the semi-automatically operating machines, for, in addition, a larger number of other operations also have to be carried out by hand. In addition, the number of dough pieces to be processed is relatively low. These so-called plate parting and kneading machines all call for care and extensive control by a skilled labor force. Thus, the dough must be carefully layed on the kneading plate, spread out and finally removed and transferred by hand.

The round drum kneader now represents a further development of the plate parting machine and kneading machine, since, in it, the insertion, the kneading and the removal of the dough is effected fully automatically, whereby the throughputs and the quality of the goods to be processed is considerably improved.

In the case of the round drum kneading devices, the dough is inserted into the automatic kneader, batch by batch, from the kneading machine. Here it is seized by two rollers and brought into the kneading path. In this case the distance apart of the two rollers determines the latter weight of the kneaded semi-finished parts. Now, there is cut out from the dough strip, by a cutting device, the corresponding dough pieces which are fed to the kneading device. The dough pieces thus arrive in drum casing openings, underneath which notches of a second kneading drum are found. The dough pieces are kneaded into the notches and drum casing openings by axial and also circumferentive oscillating movements of the inner drum, the openings in the casing of the outer drum being surrounded by a synchronous kneading strip.

As has been stated at the beginning, the dough pieces must be coated with grease at the places at which the end is to split.

In the fully-automatically operating round drum kneading devices the greasing of the dough pieces takes place after the latter have been guided out of the kneading drum. The dough parts in this case fall onto a metal sheet coated with grease by hand.

Such a method is disadvantageous for many reasons. On the one hand it is a question, in the case of the circular drum kneader, of a fully automatically operating machine, wherein basically every additional operation to be executed by hand is disadvantageous. In addition to this, it is disadvantageous to grease the dough parts just after the circular kneading, since the grease can no longer be kneaded into the end.

SUMMARY OF THE INVENTION

It is the object of the invention to eliminate or reduce the above-stated disadvantages.

According to the invention, there is provided a kneading device comprising dough receiving and kneading means for receiving dough pieces and for carrying out a kneading operation thereon, feeding means for feeding said dough pieces to said dough receiving and kneading means, means for moving said dough receiving and kneading means past said feeding means and spray means situated prior to said feeding means in the direction of movement of said dough receiving and kneading means for spraying on to said dough receiving and kneading means.

Further according to the invention, there is provided a round drum kneading device comprising a first rotary drum defining dough receiving apertures in the circumference thereof, a second rotary drum within and coaxial with said first rotary drum, defining notches in the circumference thereof cooperating with said apertures in said first rotary drum, and rotatable in the same sense as said first rotary drum but with axial and circumferential oscillations, a synchronous kneading strip surrounding said first rotary drum over part of its circumference, means for feeding dough pieces to said first rotary drum for lodging in said apertures thereof and spray nozzles situated prior to said feeding means in the sense of rotation of said first rotary drum.

BRIEF DESCRIPTION OF THE DRAWINGS

The invention will be described in greater detail, by way of example, with reference to the drawings, in which.

DESCRIPTION OF THE PREFERRED EMBODIMENT

In a preferred form of the invention, in a circular kneading device in the form of a round drum kneader, which is enclosed along the kneading distance by a synchronous kneading strip and consists of two rotary drums which rotate in the same direction horizontally and which are mounted coaxially in each other; of which drums the inner is provided with notches on the casing and is movable to-and-fro additionally both axially and peripherally relative to the outermost drum provided with kneading recesses in the form of drum casing openings, said recesses being assigned to the notches in such a manner that the notches of the inner drum execute rotatory movements in the drum casing openings, it is proposed to associate with the drum casing openings a plurality of spray nozzles stationarily and spatially in front of a dough part feed zone.

The number of the spray nozzles and their spatial assignment to the drum casing openings passing through a determined sector located in front of the dough part feed zone may be such that, with simultaneous actuation of the nozzles, several drum openings and notches are impinged on by sprayed material.

A group of spray nozzles can spray compressed air, whereas, from another group, fat, oil or a fat or oil emulsion can be sprayed into the drum casing openings. In an advantageous manner, all the nozzles can be simultaneously and automatically triggered by a signal generator. The signal generators can, in one form of embodiment of the invention, be made as cams which are arranged on the outermost periphery of the outer rotary drum and can act on a stationary switch. In a preferred development of the invention, the nozzles delivering a predetermined spray material are connected to a supply source and a source for the propellent means.

Figure 1:
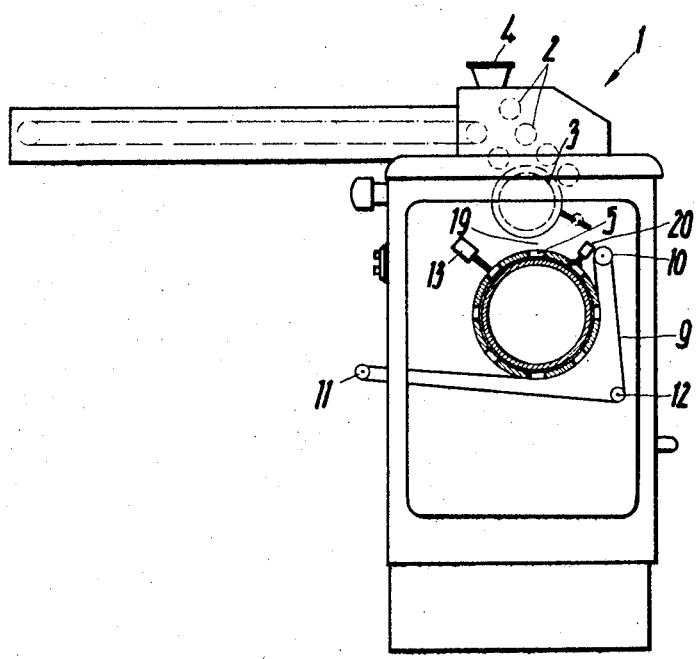
FIG. 1 shows a cross-section through a round kneading device, which is constructed in the form of a round drum kneader and contains the invention.
Figure 3:
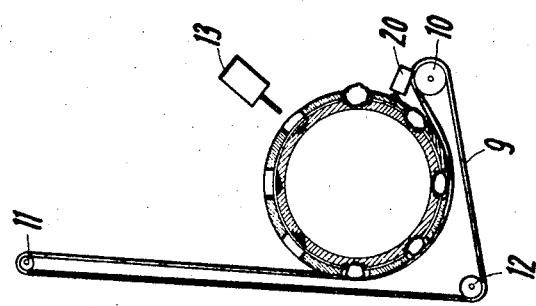
FIG. 3 is a perpendicular section through the elements according to FIG. 2.
Figure 2:
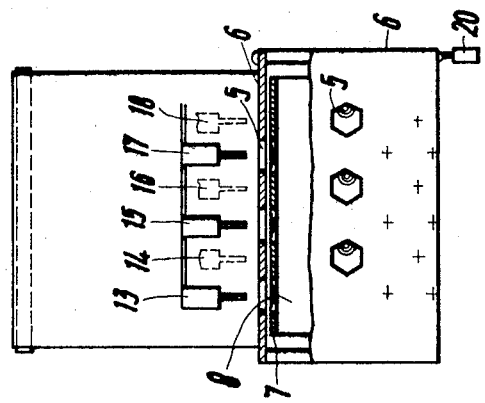
FIG. 2 is a cut away section of FIG. 1 with a view of a drum, which is partially cut away

Referring now to the drawing, a round kneading device 1, shown in FIG. 1, can be used as the head machine of a so called roll path or of another suitable assembly. The circular kneading device 1 has, in the upper part several rollers 2 which, in working together with a dough part device 3, serves to divide the dough fed through the hopper 4 into dough pieces of similar sizes. The dough pieces fall from the dough dividing device 3 into openings 5 which are uniformly distributed in the casing of an outer drum 6. A further rotary drum 7 is arranged inside the outer rotary drum 6 horizontally and coaxially, and runs in the same direction as the latter. This inner rotary drum 7 has notches 8 on the casing, which are associated with the drum casing openings of the outer drum 6. The inner drum 7 is, in addition to being rotated in the same direction as the outer drum 6, is oscillated both axially and circumferentially relative to the outer drum, so that the notches 8 in the drum casing openings 5 execute rotary movements. A synchronous kneading strip 9 which is guided as an endless strip over rollers 10, 11 and 12 is arranged about one part of the periphery of the outer drum 6 along the kneading path. A plurality of spray nozzles 13 to 18 are aligned with the drum casing openings 5, in front of a divided dough feed zone 19. These spray nozzles are firmly arranged inside the housing of the round drum kneader 1 and are in communication with supply sources and sources for the propulsion means (not shown in any further detail). The number of spray nozzles 13 to 18 and their spatial association with the drum casing openings 5 passing through the sector 19 located in front of the divided dough feed zone, is such that, with simultaneous actuation of the nozzles 13 to 18, a multiplicity of drum casing passages 5 and notches 8 will be impinged on by sprayed material which comes from the spray nozzles. A certain group of spray nozzles is simultaneously and automatically triggered by a signal generator 20. In this case the signal generator can be constructed as cams which are arranged on the outer periphery of outer rotary drum 6 and which act on a stationary switch. The signal generator 20 thus comprises of cams and a switch.

A group of spray nozzles can supply compressed air to free the nozzles 8 and drum casing openings 5 from dough residues. A directly following group of further spray nozzles delivers, in accordance a liquid fat, an oil or a fat or oil emulsion which wets the notches 8.

The plant operates as follows:

The rollers 2, the dough dividing device 3 and the drums 6 and 7 with the kneading band 9 are set into motion by a drive (not shown in any further detail). The supply sources (not shown in any further detail) and the sources for the propellent means are actuated by the signal generator 20 so that a certain group of spray nozzles 13 to 18, if in their spraying region there is a correspondingly associated group of openings 5 with notches 8, are set into operation in a pulsed manner so that the openings are wetted by the sprayed material, for example, fat or oil. A group of further nozzles upstream from them can be appropriately actuated in order to clean the notches by means of compressed air. Such an arrangement can, however, also be redundant in the case of certain forms of embodiment. The cleaned notches, wetted with fat, are then filled by dough parts from the dough parting device 3 and kneaded by rotation of the inner drum in the region of the kneading band 9. On the lower position of the outer drum, at which the kneading band runs tangential, the kneading band simultaneously serves as a transporting band to bring out the kneaded dough parts. The latter are then thrown out for further processing via the roller 11 of the strip 9 with the cuts downwards.

With the present invention it is achieved that fat is fed to the notches before the kneading operation so that it can be kneaded into the closure of the dough pieces. Thus the hitherto known processes with fully automatically operating machines, in which the fact was only applied after the kneading process by hand operation are considerably improved.

The spray nozzles according to the invention can be also subsequently built into already existing kneading devices, since the space between the tangential running part of the strip 9 and the dough division feeder region is free per se. With this the automation of the operating process is further improved upon with the round kneading devices, the operating personnel required for this purpose no longer being needed. In addition to achieving an improved end product it is also achieved that this end product leaves the machine with good uniformity.

The use of the constructional elements of the invention as opposed to previous assemblies which have been referred to leads a considerable lessening of the cost in that an operator can be dispensed with.

It will be understood that the above description of the present invention is susceptible to various modifications changes and adaptations.

What is claimed is:

1. A kneading device comprising dough receiving and kneading means for receiving dough pieces and for carrying out a kneading operation thereon, feeding means for feeding said dough pieces to said dough receiving and kneading means, means for moving said dough receiving and kneading means past said feeding means and spray means situated prior to said feeding means in the direction of movement of said dough receiving and kneading means for spraying on to said dough receiving and kneading means.

2. A round drum kneading device comprising a first rotary drum defining dough receiving apertures in the circumference thereof, a second rotary drum, defining notches in the circumference thereof cooperating with said apertures in said first rotary drum, and rotatable in the same sense as said first rotary drum but with axial and circumferential oscillations, a synchronous kneading strip surrounding said first rotary drum over part of its circumference, means for feeding dough pieces to said first rotary drum for lodging in said apertures thereof and spray nozzles situated prior to said feeding means in the sense of rotation of said first rotary drum.

3. A device as defined in claim 2, wherein said plurality of spray nozzles comprises an arrangement of spray nozzles associated with a plurality of said apertures in said first rotary drum for simultaneous operation to spray said plurality of said apertures in one operation.

4. A device as defined in claim 3, further comprising means for connecting a supply of compressed air to said spray nozzles.

5. A device as defined in claim 2, further comprising means for connecting a supply of fat to said spray nozzle.

6. A device as defined in claim 2, further comprising means for connecting a supply of oil to said spray nozzle.

7. A device as defined in claim 2, further comprising means for connecting a supply of fat emulsion to said spray nozzle.

8. A device as defined in claim 2, further comprising means for connecting a supply of oil emulsion to said spray nozzle.

9. A device as defined in claim 2, further comprising a signal generator for simultaneously and automatically triggering a plurality of said spray nozzles which are adapted to spray the same material.

10. A device as defined in claim 2, further comprising a switch for triggering a plurality of said spray nozzles and a plurality of cams on the periphery of said first rotary drum for actuating said switch.

11. A device as defined in claim 2, further comprising means for connecting a plurality of said spray nozzles in common to a source of spray material and a source of spray propellant.

* * * * *